No. 804,660. PATENTED NOV. 14, 1905.
A. JAEGER.
DUST PROOF JOINT FOR GLASS PLATES.
APPLICATION FILED DEC. 13, 1904.
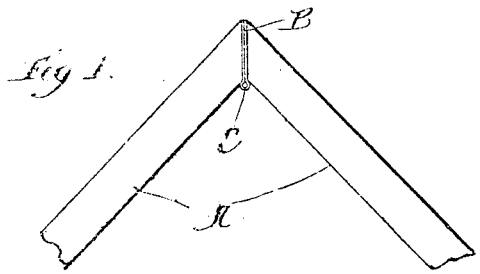
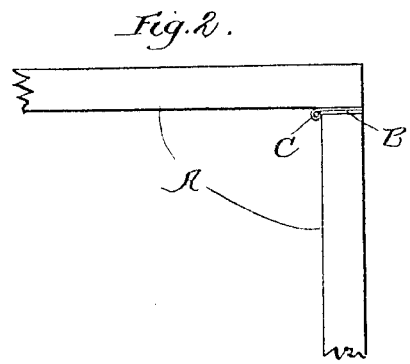
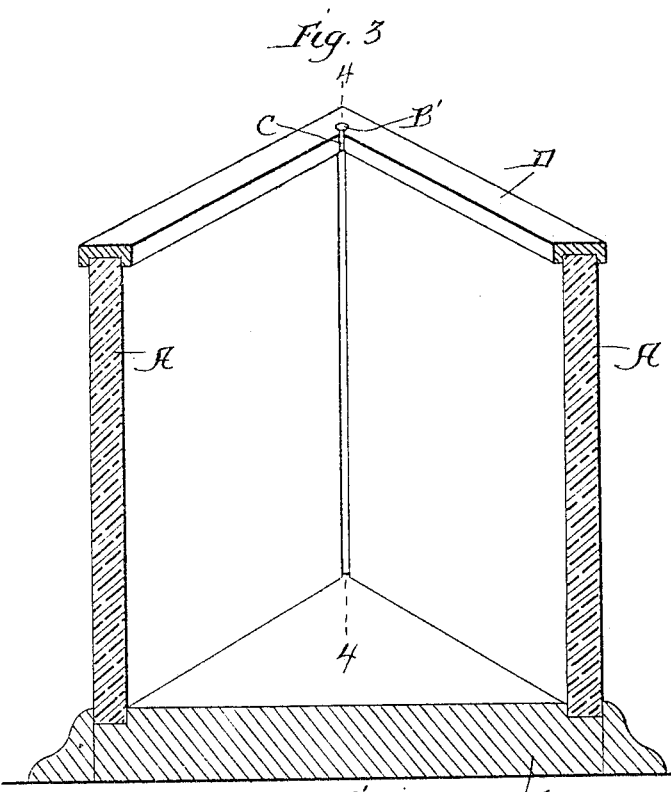
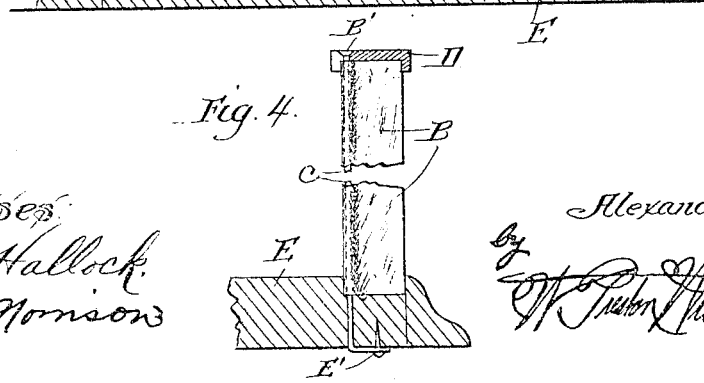
Witnesses:
H. B. Hallock
L. H. Morrison
Inventor:
Alexander Jaeger

UNITED STATES PATENT OFFICE.

ALEXANDER JAEGER, OF PHILADELPHIA, PENNSYLVANIA.

DUST-PROOF JOINT FOR GLASS PLATES.

No. 804,660.　　　　Specification of Letters Patent.　　　　Patented Nov. 14, 1905.

Application filed December 13, 1904. Serial No. 236,701.

*To all whom it may concern:*

Be it known that I, ALEXANDER JAEGER, a citizen of the United States, residing at Philadelphia, county of Philadelphia, and State of Pennsylvania, have invented a certain new and useful Improvement in Dust-Proof Joints for Glass Plates, of which the following is a specification.

My invention relates to a new and useful improvement in dust-proof joints for glass plates, and has for its object to make the joints of glass plates dust-proof in a simple, inexpensive, and durable manner.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a plan view of the joints of two plates, the joints being protected by my improvement, these plates being shown in a bevel; Fig. 2, a plan view of two plates in which one plate laps over the edge of the other, the joint between the plates being protected by my improvement; Fig. 3, a perspective sectional view of one corner of a show-case, the joint between the side plates being protected by my improvement; Fig. 4, a section taken on the line 4 4 of Fig. 3.

A represents two glass plates, the edges of which are beveled, so that the edges of the glass may come together on a miter, as shown in Fig. 1.

B represents a strip of felt or other like material which is folded around a wire C, and the two folds of the felt are adapted to lie between the edges of the glass plates A, the wire C with the felt surrounding the same lying within the crotch formed by the junction of the two glass plates. The wire stiffens the packing, and the felt by surrounding the wire forms an enlargement upon the inside of the plates which prevents the felt protruding beyond the outside of the joint.

In Fig. 2 I have shown my improvement applied wherein the glass plates overlap one another. The wire C may be secured at the top and bottom, and when it is used in connection with show-cases, as shown in Figs. 3 and 4, the wire D is headed at the upper end, as represented at B', and this head is adapted to lie within a countersunk opening formed in the strip D, lying upon the top of the side plates of the show-case. This strip D may be either notched at the corner or have an opening formed therethrough through which the wire extends. The lower end of the wire may pass through the base E and be secured below the same, as represented at E', thus serving to hold the top strip D in place, as well as holding the plates A in place within their groove in the base E.

If desired, the glass plates could be so formed as to allow the enlargement formed by the felt passing around the wire to lie wholly between the edges of the plates; but as this would require more work in forming the edges of the plates it would probably be preferable to allow the enlargement to lie just inside the junction between the two plates. By this method I am able to make the joints of said glass plates absolutely dust-proof and at the same time form a cushion between the plates, and the felt or other material used may be colored, so as to form an attractive trimming, or it may be of such a color as not to show materially through the glass.

Of course I do not wish to be limited to the exact construction here shown, as slight modifications could be made without departing from the spirit of my invention.

Having thus fully described my invention, what I claim as new and useful is—

1. In a dust-proof joint for glass plates, two glass plates extending at an angle to one another, a strip of felt or like material, a wire lying within the corner formed by the meeting of the two glass plates, said felt folded around the wire so as to form two thicknesses, the two thicknesses of felt adapted to extend and lie between the two glass plates, as and for the purpose specified.

2. In a dust-proof joint for glass plates, two glass plates coming together at an angle to one another, a wire or rod lying in the corner formed by the junction of the two plates, a strip of felt or like material folded around the wire or rod so as to form two thicknesses, said two thicknesses of felt or like material extending between the two plates, and means for securing the wire or rod at the top and bottom ends, as and for the purpose specified.

3. In a dust-proof joint for glass plates of a show-case, glass plates forming the sides of said show-case and coming together and overlapping at an angle to one another, a vertical rod or wire arranged in each inside corner of the show-case, a strip of felt or like material folded around the rod or wire so as to form two thicknesses which extend between the meeting edges of the glass plates, a retaining-strip adapted to rest upon the top of the glass plates, the upper end of the wires or rods secured in said retaining-strip, a base in which the lower ends of the glass plates rest, the lower ends of the rods or wires adapted to be secured to the base, as and for the purpose specified.

In testimony whereof I have hereunto affixed my signature in the presence of two subscribing witnesses.

ALEXANDER JAEGER.

Witnesses:
HENRY McDONNELL,
GEORGE W. HEYSER.